(12) United States Patent
Galor et al.

(10) Patent No.: US 9,030,498 B2
(45) Date of Patent: May 12, 2015

(54) COMBINING EXPLICIT SELECT GESTURES AND TIMECLICK IN A NON-TACTILE THREE DIMENSIONAL USER INTERFACE

(75) Inventors: Micha Galor, Tel Aviv (IL); Jonathan Pokrass, Bat-Yam (IL); Amir Hoffnung, Tel-Aviv (IL); Ofir Or, Ramat Gan (IL)

(73) Assignee: Apple Inc., Cupertino, CA (US)

( * ) Notice: Subject to any disclaimer, the term of this patent is extended or adjusted under 35 U.S.C. 154(b) by 25 days.

(21) Appl. No.: 13/584,831

(22) Filed: Aug. 14, 2012

(65) Prior Publication Data
US 2013/0044053 A1 Feb. 21, 2013

Related U.S. Application Data

(60) Provisional application No. 61/523,404, filed on Aug. 15, 2011, provisional application No. 61/526,692, filed on Aug. 24, 2011.

(51) Int. Cl.
*G09G 5/00* (2006.01)
*G06F 3/01* (2006.01)

(52) U.S. Cl.
CPC ........................... *G06F 3/017* (2013.01)

(58) Field of Classification Search
None
See application file for complete search history.

(56) References Cited

U.S. PATENT DOCUMENTS

| | | |
|---|---|---|
| 4,550,250 A | 10/1985 | Mueller et al. |
| 4,789,921 A | 12/1988 | Aho |
| 4,988,981 A | 1/1991 | Zimmerman et al. |
| 5,264,836 A | 11/1993 | Rubin |
| 5,495,576 A | 2/1996 | Ritchey |
| 5,588,139 A | 12/1996 | Lanier et al. |
| 5,594,469 A | 1/1997 | Freeman et al. |
| 5,846,134 A | 12/1998 | Latypov |
| 5,852,672 A | 12/1998 | Lu |
| 5,862,256 A | 1/1999 | Zetts et al. |
| 5,864,635 A | 1/1999 | Zetts et al. |

(Continued)

FOREIGN PATENT DOCUMENTS

| | | |
|---|---|---|
| WO | 9935633 A2 | 7/1999 |
| WO | 03071410 A2 | 8/2003 |

(Continued)

OTHER PUBLICATIONS

Gordon et al., "The use of Dense Stereo Range Date in Augmented Reality", Proceedings of the 1st International Symposium on Mixed and Augmented Reality (ISMAR), Darmstadt, Germany, pp. 1-10, Sep. 30-Oct. 1, 2002.

(Continued)

*Primary Examiner* — Joseph Haley
*Assistant Examiner* — Ifedayo Iluyomade
(74) *Attorney, Agent, or Firm* — D. Kligler I.P. Services Ltd.

(57) ABSTRACT

A method including presenting, by a computer, multiple interactive items on a display coupled to the computer, and receiving, from a depth sensor, a sequence of three-dimensional (3D) maps containing at least a hand of a user of the computer. An explicit select gesture performed by the user toward one of the interactive items is detected in the maps, and the one of the interactive items is selected responsively to the explicit select gesture. Subsequent to selecting the one of the interactive items, a TimeClick functionality is actuated for subsequent interactive item selections to be made by the user.

21 Claims, 5 Drawing Sheets

(56) References Cited

U.S. PATENT DOCUMENTS

| | | |
|---|---|---|
| 5,870,196 A | 2/1999 | Lulli et al. |
| 5,917,937 A | 6/1999 | Szeliski et al. |
| 5,973,700 A | 10/1999 | Taylor et al. |
| 6,002,808 A | 12/1999 | Freeman |
| 6,005,548 A | 12/1999 | Latypov et al. |
| 6,064,387 A | 5/2000 | Canaday et al. |
| 6,072,494 A | 6/2000 | Nguyen |
| 6,084,979 A | 7/2000 | Kanade et al. |
| 6,111,580 A | 8/2000 | Kazama et al. |
| 6,191,773 B1 | 2/2001 | Maruno et al. |
| 6,215,890 B1 | 4/2001 | Matsuo et al. |
| 6,229,541 B1 | 5/2001 | Kamen et al. |
| 6,243,054 B1 | 6/2001 | DeLuca |
| 6,252,988 B1 | 6/2001 | Ho |
| 6,256,033 B1 | 7/2001 | Nguyen |
| 6,262,740 B1 | 7/2001 | Lauer et al. |
| 6,345,111 B1 | 2/2002 | Yamaguchi et al. |
| 6,345,893 B2 | 2/2002 | Fateh et al. |
| 6,452,584 B1 | 9/2002 | Walker et al. |
| 6,456,262 B1 | 9/2002 | Bell |
| 6,507,353 B1 | 1/2003 | Huard et al. |
| 6,512,838 B1 | 1/2003 | Rafii et al. |
| 6,519,363 B1 | 2/2003 | Su et al. |
| 6,559,813 B1 | 5/2003 | DeLuca et al. |
| 6,681,031 B2 | 1/2004 | Cohen et al. |
| 6,686,921 B1 | 2/2004 | Rushmeier et al. |
| 6,690,370 B2 | 2/2004 | Ellenby et al. |
| 6,741,251 B2 | 5/2004 | Malzbender |
| 6,791,540 B1 | 9/2004 | Baumberg |
| 6,803,928 B2 | 10/2004 | Bimber et al. |
| 6,853,935 B2 | 2/2005 | Satoh et al. |
| 6,857,746 B2 | 2/2005 | Dyner |
| 6,951,515 B2 | 10/2005 | Ohshima et al. |
| 6,977,654 B2 | 12/2005 | Malik et al. |
| 7,003,134 B1 | 2/2006 | Covell et al. |
| 7,013,046 B2 | 3/2006 | Kawamura et al. |
| 7,023,436 B2 | 4/2006 | Segawa et al. |
| 7,042,440 B2 | 5/2006 | Pryor et al. |
| 7,042,442 B1 | 5/2006 | Kanevsky et al. |
| 7,151,530 B2 | 12/2006 | Roeber et al. |
| 7,170,492 B2 | 1/2007 | Bell |
| 7,215,815 B2 | 5/2007 | Honda |
| 7,227,526 B2 | 6/2007 | Hildreth et al. |
| 7,257,237 B1 | 8/2007 | Luck et al. |
| 7,259,747 B2 | 8/2007 | Bell |
| 7,264,554 B2 | 9/2007 | Bentley |
| 7,289,227 B2 | 10/2007 | Smetak et al. |
| 7,289,645 B2 | 10/2007 | Yamamoto et al. |
| 7,295,697 B1 | 11/2007 | Satoh |
| 7,301,648 B2 | 11/2007 | Foxlin |
| 7,302,099 B2 | 11/2007 | Zhang et al. |
| 7,333,113 B2 | 2/2008 | Gordon |
| 7,340,077 B2 | 3/2008 | Gokturk |
| 7,340,399 B2 | 3/2008 | Friedrich et al. |
| 7,348,963 B2 | 3/2008 | Bell |
| 7,358,972 B2 | 4/2008 | Gordon et al. |
| 7,370,883 B2 | 5/2008 | Basir et al. |
| 7,427,996 B2 | 9/2008 | Yonezawa et al. |
| 7,428,542 B1 | 9/2008 | Fink et al. |
| 7,474,256 B2 | 1/2009 | Ohta et al. |
| 7,508,377 B2 | 3/2009 | Pihlaja et al. |
| 7,526,120 B2 | 4/2009 | Gokturk et al. |
| 7,536,032 B2 | 5/2009 | Bell |
| 7,573,480 B2 | 8/2009 | Gordon |
| 7,576,727 B2 | 8/2009 | Bell |
| 7,580,572 B2 | 8/2009 | Bang et al. |
| 7,590,941 B2 | 9/2009 | Wee et al. |
| 7,688,998 B2 | 3/2010 | Tuma et al. |
| 7,696,876 B2 | 4/2010 | Dimmer et al. |
| 7,724,250 B2 | 5/2010 | Ishii et al. |
| 7,762,665 B2 | 7/2010 | Vertegaal et al. |
| 7,774,155 B2 | 8/2010 | Sato et al. |
| 7,812,842 B2 | 10/2010 | Gordon |
| 7,821,541 B2 | 10/2010 | Delean |
| 7,834,847 B2 | 11/2010 | Boillot |
| 7,840,031 B2 | 11/2010 | Albertson et al. |
| 7,844,914 B2 | 11/2010 | Andre et al. |
| 7,925,549 B2 | 4/2011 | Looney et al. |
| 7,971,156 B2 | 6/2011 | Albertson et al. |
| 8,154,781 B2 | 4/2012 | Kroll et al. |
| 8,166,421 B2 | 4/2012 | Magal et al. |
| 8,183,977 B2 | 5/2012 | Matsumoto |
| 8,194,921 B2 | 6/2012 | Kongqiao et al. |
| 8,214,098 B2 | 7/2012 | Murray et al. |
| 8,218,211 B2 | 7/2012 | Kroll et al. |
| 8,368,647 B2 | 2/2013 | Lin |
| 8,405,604 B2 | 3/2013 | Pryor et al. |
| 8,416,276 B2 | 4/2013 | Kroll et al. |
| 8,446,459 B2 | 5/2013 | Fang et al. |
| 8,448,083 B1 | 5/2013 | Migos et al. |
| 8,462,199 B2 | 6/2013 | Givon |
| 8,514,221 B2 | 8/2013 | King et al. |
| 8,514,251 B2 | 8/2013 | Hildreth et al. |
| 8,625,882 B2 | 1/2014 | Backlund et al. |
| 2002/0057383 A1 | 5/2002 | Iwamura |
| 2002/0071607 A1 | 6/2002 | Kawamura et al. |
| 2002/0158873 A1 | 10/2002 | Williamson |
| 2003/0057972 A1 | 3/2003 | Pfaff et al. |
| 2003/0063775 A1 | 4/2003 | Rafii et al. |
| 2003/0088463 A1 | 5/2003 | Kanevsky |
| 2003/0156756 A1 | 8/2003 | Gokturk et al. |
| 2003/0185444 A1 | 10/2003 | Honda |
| 2003/0227453 A1 | 12/2003 | Beier et al. |
| 2003/0235341 A1 | 12/2003 | Gokturk et al. |
| 2004/0046744 A1 | 3/2004 | Rafii et al. |
| 2004/0104935 A1 | 6/2004 | Williamson |
| 2004/0135744 A1 | 7/2004 | Bimber et al. |
| 2004/0155962 A1 | 8/2004 | Marks |
| 2004/0174770 A1 | 9/2004 | Rees |
| 2004/0183775 A1 | 9/2004 | Bell |
| 2004/0184640 A1 | 9/2004 | Bang et al. |
| 2004/0184659 A1 | 9/2004 | Bang et al. |
| 2004/0193413 A1 | 9/2004 | Wilson et al. |
| 2004/0222977 A1 | 11/2004 | Bear et al. |
| 2007/4025831 | 12/2004 | Hashimoto |
| 2005/0031166 A1 | 2/2005 | Fujimura et al. |
| 2005/0088407 A1 | 4/2005 | Bell et al. |
| 2005/0089194 A1 | 4/2005 | Bell |
| 2005/0110964 A1 | 5/2005 | Bell et al. |
| 2005/0122308 A1 | 6/2005 | Bell et al. |
| 2005/0162381 A1 | 7/2005 | Bell et al. |
| 2005/0190972 A1 | 9/2005 | Thomas et al. |
| 2005/0254726 A1 | 11/2005 | Fuchs et al. |
| 2005/0265583 A1 | 12/2005 | Covell et al. |
| 2006/0010400 A1 | 1/2006 | Dehlin et al. |
| 2006/0092138 A1 | 5/2006 | Kim et al. |
| 2006/0110008 A1 | 5/2006 | Vertegaal et al. |
| 2006/0115155 A1 | 6/2006 | Lui et al. |
| 2006/0139314 A1 | 6/2006 | Bell |
| 2006/0149737 A1 | 7/2006 | Du et al. |
| 2006/0159344 A1 | 7/2006 | Shao et al. |
| 2006/0187196 A1 | 8/2006 | Underkoffler et al. |
| 2006/0239670 A1 | 10/2006 | Cleveland |
| 2006/0248475 A1 | 11/2006 | Abrahamsson |
| 2007/0078552 A1 | 4/2007 | Rosenberg |
| 2007/0130547 A1 | 6/2007 | Boillot |
| 2007/0154116 A1 | 7/2007 | Shieh |
| 2007/0230789 A1 | 10/2007 | Chang et al. |
| 2007/0285554 A1 | 12/2007 | Givon |
| 2008/0030460 A1 | 2/2008 | Hildreth et al. |
| 2008/0059915 A1 | 3/2008 | Boillot |
| 2008/0062123 A1 | 3/2008 | Bell |
| 2008/0094371 A1 | 4/2008 | Forstall et al. |
| 2008/0123940 A1 | 5/2008 | Kundu et al. |
| 2008/0150890 A1 | 6/2008 | Bell et al. |
| 2008/0150913 A1 | 6/2008 | Bell et al. |
| 2008/0170776 A1 | 7/2008 | Albertson et al. |
| 2008/0236902 A1 | 10/2008 | Imaizumi |
| 2008/0252596 A1 | 10/2008 | Bell et al. |
| 2008/0256494 A1 | 10/2008 | Greenfield |
| 2008/0260250 A1 | 10/2008 | Vardi |
| 2008/0281583 A1* | 11/2008 | Slothouber et al. ............ 704/10 |
| 2008/0287189 A1 | 11/2008 | Rabin |
| 2009/0009593 A1 | 1/2009 | Cameron et al. |

(56) References Cited

U.S. PATENT DOCUMENTS

| | | |
|---|---|---|
| 2009/0027335 A1 | 1/2009 | Ye |
| 2009/0027337 A1 | 1/2009 | Hildreth |
| 2009/0031240 A1 | 1/2009 | Hildreth |
| 2009/0033623 A1 | 2/2009 | Lin |
| 2009/0040215 A1 | 2/2009 | Afzulpurkar et al. |
| 2009/0073117 A1 | 3/2009 | Tsurumi et al. |
| 2009/0077504 A1 | 3/2009 | Bell |
| 2009/0078473 A1 | 3/2009 | Overgard et al. |
| 2009/0083122 A1 | 3/2009 | Angell et al. |
| 2009/0083622 A1 | 3/2009 | Chien et al. |
| 2009/0096783 A1 | 4/2009 | Shpunt et al. |
| 2009/0183125 A1 | 7/2009 | Magal et al. |
| 2009/0195392 A1 | 8/2009 | Zalewski |
| 2009/0228841 A1 | 9/2009 | Hildreth |
| 2009/0256817 A1 | 10/2009 | Perlin et al. |
| 2009/0284542 A1 | 11/2009 | Baar et al. |
| 2009/0297028 A1 | 12/2009 | De Haan |
| 2010/0002936 A1 | 1/2010 | Khomo et al. |
| 2010/0007717 A1 | 1/2010 | Spektor et al. |
| 2010/0034457 A1 | 2/2010 | Berliner et al. |
| 2010/0036717 A1 | 2/2010 | Trest |
| 2010/0053151 A1 | 3/2010 | Marti et al. |
| 2010/0053304 A1 | 3/2010 | Underkoffler et al. |
| 2010/0071965 A1 | 3/2010 | Hu et al. |
| 2010/0083189 A1 | 4/2010 | Arlein et al. |
| 2010/0103106 A1 | 4/2010 | Chui |
| 2010/0149096 A1 | 6/2010 | Migos et al. |
| 2010/0164897 A1 | 7/2010 | Morin et al. |
| 2010/0177933 A1 | 7/2010 | Willmann et al. |
| 2010/0199228 A1 | 8/2010 | Latta et al. |
| 2010/0199231 A1 | 8/2010 | Markovic et al. |
| 2010/0229125 A1 | 9/2010 | Cha |
| 2010/0234094 A1 | 9/2010 | Gagner et al. |
| 2010/0235786 A1 | 9/2010 | Maizels et al. |
| 2010/0295781 A1* | 11/2010 | Alameh et al. ............... 345/158 |
| 2011/0006978 A1 | 1/2011 | Yuan |
| 2011/0007035 A1 | 1/2011 | Shai |
| 2011/0018795 A1 | 1/2011 | Jang |
| 2011/0029918 A1 | 2/2011 | Yoo et al. |
| 2011/0052006 A1 | 3/2011 | Gurman et al. |
| 2011/0081072 A1 | 4/2011 | Kawasaki et al. |
| 2011/0087970 A1 | 4/2011 | Swink et al. |
| 2011/0141053 A1 | 6/2011 | Bulea et al. |
| 2011/0144543 A1 | 6/2011 | Tsuzuki et al. |
| 2011/0164029 A1* | 7/2011 | King et al. ............... 345/419 |
| 2011/0164032 A1 | 7/2011 | Shadmi |
| 2011/0164141 A1 | 7/2011 | Tico et al. |
| 2011/0193939 A1 | 8/2011 | Vassigh et al. |
| 2011/0205186 A1 | 8/2011 | Newton et al. |
| 2011/0211754 A1 | 9/2011 | Litvak et al. |
| 2011/0225536 A1 | 9/2011 | Shams et al. |
| 2011/0227820 A1 | 9/2011 | Haddick et al. |
| 2011/0231757 A1 | 9/2011 | Haddick et al. |
| 2011/0242102 A1 | 10/2011 | Hess |
| 2011/0248914 A1 | 10/2011 | Sherr |
| 2011/0254765 A1 | 10/2011 | Brand |
| 2011/0254798 A1 | 10/2011 | Adamson et al. |
| 2011/0260965 A1 | 10/2011 | Kim et al. |
| 2011/0261058 A1 | 10/2011 | Luo |
| 2011/0279397 A1 | 11/2011 | Rimon et al. |
| 2011/0291926 A1 | 12/2011 | Gokturk et al. |
| 2011/0292036 A1 | 12/2011 | Sali et al. |
| 2011/0293137 A1 | 12/2011 | Gurman et al. |
| 2011/0296353 A1 | 12/2011 | Ahmed et al. |
| 2011/0310010 A1 | 12/2011 | Hoffnung et al. |
| 2012/0001875 A1 | 1/2012 | Li et al. |
| 2012/0038550 A1 | 2/2012 | Lemmey et al. |
| 2012/0078614 A1 | 3/2012 | Galor et al. |
| 2012/0117514 A1 | 5/2012 | Kim et al. |
| 2012/0169583 A1 | 7/2012 | Rippel et al. |
| 2012/0173067 A1 | 7/2012 | Szczebra et al. |
| 2012/0202569 A1 | 8/2012 | Maizels et al. |
| 2012/0204133 A1 | 8/2012 | Guendelman et al. |
| 2012/0223882 A1 | 9/2012 | Galor et al. |
| 2012/0249416 A1 | 10/2012 | Maciocci et al. |
| 2012/0268369 A1 | 10/2012 | Kikkeri |
| 2012/0275680 A1 | 11/2012 | Omi |
| 2012/0295661 A1* | 11/2012 | Kim et al. ............... 455/556.1 |
| 2012/0313848 A1 | 12/2012 | Galor et al. |
| 2012/0320080 A1* | 12/2012 | Giese et al. ............... 345/619 |
| 2013/0002801 A1 | 1/2013 | Mock |
| 2013/0014052 A1 | 1/2013 | Frey et al. |
| 2013/0044053 A1 | 2/2013 | Galor et al. |
| 2013/0055120 A1 | 2/2013 | Galor et al. |
| 2013/0055150 A1 | 2/2013 | Galor |
| 2013/0058565 A1 | 3/2013 | Rafii et al. |
| 2013/0106692 A1 | 5/2013 | Maizels et al. |
| 2013/0107021 A1 | 5/2013 | Maizels et al. |
| 2013/0155070 A1 | 6/2013 | Luo |
| 2013/0207920 A1 | 8/2013 | McCann et al. |
| 2014/0108930 A1 | 4/2014 | Asnis |

FOREIGN PATENT DOCUMENTS

| | | |
|---|---|---|
| WO | 2004107272 A1 | 12/2004 |
| WO | 2005003948 A1 | 1/2005 |
| WO | 2005094958 A1 | 10/2005 |
| WO | 2007043036 A1 | 4/2007 |
| WO | 2007078639 A1 | 7/2007 |
| WO | 2007105205 A2 | 9/2007 |
| WO | 2007132451 A2 | 11/2007 |
| WO | 2007135376 A2 | 11/2007 |
| WO | 2008120217 A2 | 10/2008 |
| WO | 2012011044 A1 | 1/2012 |
| WO | 2012020380 A1 | 2/2012 |
| WO | 2012107892 A1 | 8/2012 |

OTHER PUBLICATIONS

Agrawala et al., "The two-user Responsive Workbench :support for collaboration through individual views of a shared space", Proceedings on the 24th conference on computer graphics and interactive techniques (SIGGRAPH 97), Los Angeles, USA, pp. 327-332 , Aug. 3-8, 1997.

Harman et al., "Rapid 2D-to 3D conversion", Proceedings of SPIE Conference on Stereoscopic Displays and Virtual Reality Systems, vol. 4660, pp. 78-86, Jan. 21-23, 2002.

Hoff et al., "Analysis of head pose accuracy in augmented reality", IEEE Transactions on Visualization and Computer Graphics, vol. 6, No. 4, pp. 319-334, Oct.-Dec. 2000.

Poupyrev et al., "The go-go interaction technique: non-liner mapping for direct manipulation in VR", Proceedings of the 9th annual ACM Symposium on User interface software and technology (UIST '96), Washington, USA, pp. 79-80, Nov. 6-8, 1996.

Wexelblat et al., "Virtual Reality Applications and Explorations", Academic Press Inc., San Diego, USA, 262 pages, year 1993.

U.S. Appl. No. 13/161,508 Office Action dated Apr. 10, 2013.

U.S. Appl. No. 12/683,452 Office Action dated Jun. 7, 2013.

Galor, M., U.S. Appl. No. 13/778,172 "Asymmetric Mapping in Tactile and Non-Tactile User Interfaces" filed Feb. 27, 2013.

Berenson et al., U.S. Appl. No. 13/904,050 "Zoom-based gesture user interface" filed May 29, 2013.

Berenson et al., U.S. Appl. No. 13/904,052 "Gesture-based interface with enhanced features" filed May 29, 2013.

Bychkov et al., U.S. Appl. No. 13/849,514 "Gaze-enhanced Virtual Touchscreen" filed Mar. 24, 2013.

Guendelman et al., U.S. Appl. No. 13/849,514 "Enhanced Virtual Touchpad" filed Mar. 24, 2013.

Miller, R., "Kinect for XBox 360 Review", Engadget, Nov. 4, 2010.

U.S. Appl. No. 13/161,508 Office Action dated Sep. 9, 2013.

International Application PCT/IB2013/052332 Search Report dated Aug. 26, 2013.

U.S. Appl. No. 13/314,210 Office Action dated Jul. 19, 2013.

U.S. Appl. No. 13/314,207 Office Action dated Aug. 5, 2013.

Sun et al., "SRP Based Natural Interaction Between Real and Virtual Worlds in Augmented Reality", Proceedings of the International Conference on Cyberworlds (CW'08), pp. 117-124, Sep. 22-24, 2008.

(56) References Cited

OTHER PUBLICATIONS

Schmalstieg et al., "The Studierstube Augmented Reality Project", Presence: Teleoperators and Virtual Environments, vol. 11, No. 1, pp. 33-54, Feb. 2002.
Ohta et al., "Share-Z: Client/Server Depth Sensing for See-Through Head-Mounted Displays", Presence: Teleoperators and Virtual Environments, vol. 11, No. 2, pp. 176-188, Apr. 2002.
Gobbetti et al., "VB2: an Architecture for Interaction in Synthetic Worlds", Proceedings of the 6th Annual ACM Symposium on User Interface Software and Technology (UIST'93), pp. 167-178, Nov. 3-5, 1993.
Gargallo et al., "Bayesian 3D Modeling from Images Using Multiple Depth Maps", Proceedings of the IEEE Computer Society Conference on Computer Vision and Pattern Recognition (CVPR'05), vol. 2, pp. 885-891, Jun. 20-25, 2005.
U.S. Appl. No. 13/541,786, filed Jul. 5, 2012.
U.S. Appl. No. 61/652,899, filed May 30, 2012.
U.S. Appl. No. 13/244,490 Office Action dated Dec. 6, 2013.
U.S. Appl. No. 13/423,314 Office Action dated Dec. 4, 2013.
U.S. Appl. No. 13/423,322 Office Action dated Nov. 1, 2013.
Bleiwess et al., "Fusing Time-of-Flight Depth and Color for Real-Time Segmentation and Tracking", Dyn3D 2009, Lecture Notes in Computer Science 5742, pp. 58-69, Jena, Germany, Sep. 9, 2009.
Bleiwess et al., "Markerless Motion Capture Using a Single Depth Sensor", SIGGRAPH Asia 2009, Yokohama, Japan, Dec. 16-19, 2009.
Bevilacqua et al., "People Tracking Using a Time-Of-Flight Depth Sensor", Proceedings of the IEEE International Conference on Video and Signal Based Surveillance, Sydney, Australia, Nov. 22-24, 2006.
Bradski, G., "Computer Vision Face Tracking for Use in a Perceptual User Interface", Intel Technology Journal, vol. 2, issue 2 (2nd Quarter 2008).
Comaniciu et al., "Kernel-Based Object Tracking", IEEE Transactions on Pattern Analysis and Machine Intelligence, vol. 25, No. 5, pp. 564-577, May 2003.
Gesturetec Inc., "Gesture Control Solutions for Consumer Devices", Canada, 2009.
Gokturk et al., "A Time-Of-Flight Depth Sensor—System Description, Issues and Solutions", Proceedings of the 2004 Conference on Computer Vision and Patter Recognition Workshop (CVPRW'04), vol. 3, pp. 35, Jun. 27-Jul. 2, 2004.
Grest et al., "Single View Motion Tracking by Depth and Silhouette Information", SCIA 2007—Scandinavian Conference on Image Analysis, Lecture Notes in Computer Science 4522, pp. 719-729, Aalborg, Denmark, Jun. 10-14, 2007.
Haritaoglu et al., "Ghost 3d: Detecting Body Posture and Parts Using Stereo", Proceedings of the IEEE Workshop on Motion and Video Computing (Motion'02), pp. 175-180, Orlando, USA, Dec. 5-6, 2002.
Haritaoglu et al., "W4S : A real-time system for detecting and tracking people in 2<1/2>D", ECCV 98—5th European conference on computer vision, vol. 1407, pp. 877-892, Freiburg , Germany, Jun. 2-6, 1998.
Harville, M., "Stereo Person Tracking with Short and Long Term Plan—View Appearance Models of Shape and Color", Proceedings of the IEEE International Conference on Advanced Video and Signal-Based Surveillance (AVSSS—2005), pp. 522-527, Como, Italy, Sep. 15-16, 2005.
Holte, M., "Fusion of Range and Intensity Information for View Invariant Gesture Recognition", IEEE Conference on Computer Vision and Pattern Recognition Workshops (CVPRW '08), pp. 1-7, Anchorage, USA, Jun. 23-28, 2008.
Kaewtrakulpong et al., "An Improved Adaptive Background Mixture Model for Real-Time Tracking with Shadow Detection", Proceedings of the 2nd European Workshop on Advanced Video Based Surveillance Systems (AVBS'01), Kingston, UK, Sep. 2001.
Kolb et al., "ToF-Sensors: New Dimensions for Realism and Interactivity", Proceedings of the IEEE Conference on Computer Vision and Patter Recognition Workshops, pp. 1-6, Anchorage, USA, Jun. 23-28, 2008.
Kolsch et al., "Fast 2D Hand Tracking with Flocks of Features and Multi-Cue Integration", IEEE Workshop on Real-Time Time Vision for Human Computer Interaction (at CVPR'04), Washington, USA, Jun. 27-Jul. 2, 2004.
Krumm et al., "Multi-Camera Multi-Person Tracking for EasyLiving", 3rd IEEE International Workshop on Visual Surveillance, Dublin, Ireland, Jul. 1, 2000.
Leens et al., "Combining Color, Depth, and Motion for Video Segmentation", ICVS 2009—7th International Conference on Computer Vision Systems, Liege, Belgium Oct. 13-15, 2009.
MacCormick et al., "Partitioned Sampling, Articulated Objects, and Interface-Quality Hand Tracking", ECCV '00—Proceedings of the 6th European Conference on Computer Vision—Part II , pp. 3-19, Dublin, Ireland, Jun. 26-Jul. 1, 2000.
Malassiotis et al., "Real-Time Hand Posture Recognition Using Range Data", Image and Vision Computing, vol. 26, No. 7, pp. 1027-1037, Jul. 2, 2008.
Morano et al., "Structured Light Using Pseudorandom Codes", IEEE Transactions on Pattern Analysis and Machine Intelligence, vol. 20, issue 3, pp. 322-327, Mar. 1998.
Munoz-Salinas et al., "People Detection and Tracking Using Stereo Vision and Color", Image and Vision Computing, vol. 25, No. 6, pp. 995-1007, Jun. 1, 2007.
Nanda et al., "Visual Tracking Using Depth Data", Proceedings of the 2004 Conference on Computer Vision and Patter Recognition Workshop, vol. 3, Washington, USA, Jun. 27-Jul. 2, 2004.
Scharstein et al., "High-Accuracy Stereo Depth Maps Using Structured Light", IEEE Conference on Computer Vision and Patter Recognition, vol. 1, pp. 195-2002, Madison, USA, Jun. 2003.
Shi et al., "Good Features to Track", IEEE Conference on Computer Vision and Pattern Recognition, pp. 593-600, Seattle, USA, Jun. 21-23, 1994.
Siddiqui et al., "Robust Real-Time Upper Body Limb Detection and Tracking", Proceedings of the 4th ACM International Workshop on Video Surveillance and Sensor Networks, Santa Barbara, USA, Oct. 27, 2006.
Softkinetic S.A., IISU™—3D Gesture Recognition Platform for Developers of 3D Applications, Belgium, Brussels, 2007-2010.
Sudderth et al., "Visual Hand Tracking Using Nonparametric Belief Propagation", IEEE Workshop on Generative Model Based Vision at CVPR'04, Washington, USA, Jun. 27-Jul. 2, 2004.
Tsap, L. "Gesture-Tracking in Real Time with Dynamic Regional Range Computation", Real-Time Imaging, vol. 8, issue 2, pp. 115-126, Apr. 2002.
Xu et al., "A Multi-Cue-Based Human Body Tracking System", Proceedings of the 5ths International Conference on Computer Vision Systems (ICVS 2007), Germany, Mar. 21-24, 2007.
Xu et al., "Human Detecting Using Depth and Gray Images", Proceedings of the IEE Conference on Advanced Video and Signal Based Surveillance (AVSS'03), Miami, USA, Jul. 21-22, 2003.
Yilmaz et al., "Object Tracking: A Survey", ACM Computing Surveys, vol. 38, No. 4, article 13, Dec. 2006.
Zhu et al., "Controlled Human Pose Estimation From Depth Image Streams", IEEE Conference on Computer Vision and Patter Recognition Workshops, pp. 1-8, Anchorage, USA, Jun. 23-27, 2008.
International Application PCT/IB2010/051055 Search Report dated Sep. 1, 2010.
La Viola, J. Jr., "Whole-Hand and Speech Input in Virtual Environments", Computer Science Department, Florida Atlantic University, USA, 1996.
Martell, C., "Form: An Experiment in the Annotation of the Kinematics of Gesture", Dissertation, Computer and Information Science, University of Pennsylvania, 2005.
U.S. Appl. No. 12/352,622 Official Action dated Mar. 31, 2011.
Prime Sense Inc., "Prime Sensor™ NITE 1.1 Framework Programmer's Guide", Version 1.2, year 2009.
Primesense Corporation, "PrimeSensor Reference Design 1.08", USA, year 2010.
U.S. Appl. No. 13/592,352, filed Aug. 23, 2012.
U.S. Appl. No. 61/615,403, filed Mar. 26, 2012.
U.S. Appl. No. 61/603,949, filed Feb. 28, 2012.
U.S. Appl. No. 61/525,771, filed Aug. 21, 2011.
U.S. Appl. No. 61/663,638, filed Jun. 25, 2012.

(56) References Cited

OTHER PUBLICATIONS

U.S. Appl. No. 61/538,970, filed Sep. 26, 2011.
U.S. Appl. No. 13/592,369, filed Aug. 23, 2012.
International Application PCT/IB2011/053192 Search Report dated Dec. 6, 2011.
U.S. Appl. No. 13/314,210, filed Dec. 8, 2011.
U.S. Appl. No. 12/352,622 Official Action dated Sep. 30, 2011.
Hart, D., U.S. Appl. No. 09/616,606 "Method and System for High Resolution, Ultra Fast 3-D Imaging" filed Jul. 14, 2000.
International Application PCT/IL2007/000306 Search Report dated Oct. 2, 2008.
International Application PCT/IL2007/000574 Search Report dated Sep. 10, 2008.
International Application PCT/IL2006/000335 Preliminary Report on Patentability dated Apr. 24, 2008.
Avidan et al., "Trajectory triangulation: 3D reconstruction of moving points from amonocular image sequence", IEEE Transactions on Pattern Analysis and Machine Intelligence (PAMI), vol. 22, No. 4, pp. 348-3537, Apr. 2000.
Leclerc et al., "The direct computation of height from shading", The Proceedings of the IEEE Computer Society Conference on Computer Vision and Pattern Recognition (CVPR), pp. 552-558, USA, Jun. 1991.
Zhang et al., "Shape from intensity gradient", IEEE Transactions on Systems, Man and Cybernetics—Part A: Systems and Humans, vol. 29, No. 3, pp. 318-325, May 1999.
Zhang et al., "Height recovery from intensity gradients", IEEE Computer Society Conference on Computer Vision and Pattern Recognition (CVPR), pp. 508-513, Jun. 21-23, 1994.
Horn, B., "Height and gradient from shading", International Journal of Computer Vision, vol. 5, No. 1, pp. 37-76, Aug. 1990.
Bruckstein, A., "On shape from shading", Computer Vision, Graphics & Image Processing, vol. 44, pp. 139-154, year 1988.
Zhang et al., "Rapid Shape Acquisition Using Color Structured Light and Multi-Pass Dynamic Programming", 1st International Symposium on 3D Data Processing Visualization and Transmission (3DPVT), Italy, Jul. 2002.
Besl, P., "Active, Optical Range Imaging Sensors", Machine vision and applications, vol. 1, pp. 127-152, year 1988.
Horn et al., "Toward optimal structured light patterns", Proceedings of International Conference on Recent Advances in 3D Digital Imaging and Modeling, pp. 28-37, Ottawa, Canada, May 1997.
Goodman, J.W., "Statistical Properties of Laser Speckle Patterns", Laser Speckle and Related Phenomena, pp. 9-75, Springer-Verlag, Berlin Heidelberg, 1975.
Asada et al., "Determining Surface Orientation by Projecting a Stripe Pattern", IEEE Transactions on Pattern Analysis and Machine Intelligence (PAMI), vol. 10, No. 5, pp. 749-754, Sep. 1988.
Winkelbach et al., "Shape from Single Stripe Pattern Illumination", Luc Van Gool (Editor), (DAGM 2002), Lecture Notes in Computer Science 2449, p. 240-247, Springer 2002.
Koninckx et al., "Efficient, Active 3D Acquisition, based on a Pattern-Specific Snake", Luc Van Gool (Editor), (DAGM 2002), Lecture Notes in Computer Science 2449, pp. 557-565, Springer 2002.
Kimmel et al., "Analyzing and synthesizing images by evolving curves with the Osher-Sethian method", International Journal of Computer Vision, vol. 24, No. 1, pp. 37-56, year 1997.
Zigelman et al., "Texture mapping using surface flattening via multi-dimensional scaling", IEEE Transactions on Visualization and Computer Graphics, vol. 8, No. 2, pp. 198-207, Apr. 2002.
Dainty, J.C., "Introduction", Laser Speckle and Related Phenomena, pp. 1-7, Springer-Verlag, Berlin Heidelberg, 1975.
Mendlovic et al., "Composite harmonic filters for scale, projection and shift invariant pattern recognition", Applied Optics Journal, vol. 34, No. 2, Jan. 10, 1995.
Fua et al., "Human Shape and Motion Recovery Using Animation Models", 19th Congress, International Society for Photogrammetry and Remote Sensing, Amsterdam, The Netherlands, Jul. 2000.
Allard et al., "Marker-less Real Time 3D modeling for Virtual Reality", Immersive Projection Technology, Iowa State University, year 2004.
Howe et al., "Bayesian Reconstruction of 3D Human Motion from Single-Camera Video", Advanced in Neural Information Processing Systems, vol. 12, pp. 820-826, USA 1999.
Li et al., "Real-Time 3D Motion Tracking with Known Geometric Models", Real-Time Imaging Journal, vol. 5, pp. 167-187, Academic Press 1999.
Grammalidis et al., "3-D Human Body Tracking from Depth Images Using Analysis by Synthesis", Proceedings of the IEEE International Conference on Image Processing (ICIP2001), pp. 185-188, Greece, Oct. 7-10, 2001.
Segen et al., "Shadow gestures: 3D hand pose estimation using a single camera", Proceedings of IEEE International Conference on Computer Vision and Pattern Recognition, pp. 479-485, Fort Collins, USA, 1999.
Vogler et al., "ASL recognition based on a coupling between HMMs and 3D motion analysis", Proceedings of IEEE International Conference on Computer Vision, pp. 363-369, Mumbai, India, 1998.
Nam et al., "Recognition of Hand Gestures with 3D, Nonlinear Arm Movements", Pattern Recognition Letters, vol. 18, No. 1, pp. 105-113, Elsevier Science B.V. 1997.
Nesbat, S., "A System for Fast, Full-Text Entry for Small Electronic Devices", Proceedings of the 5th International Conference on Multimodal Interfaces, ICMI 2003, Vancouver, Nov. 5-7, 2003.
Ascension Technology Corporation, "Flock of Birds: Real-Time Motion Tracking", 2008.
Segen et al., "Human-computer interaction using gesture recognition and 3D hand tracking", ICIP 98, Proceedings of the IEEE International Conference on Image Processing, vol. 3, pp. 188-192, Oct. 4-7, 1998.
Dekker, L., "Building Symbolic Information for 3D Human Body Modeling from Range Data", Proceedings of the Second International Conference on 3D Digital Imaging and Modeling, IEEE computer Society, pp. 388-397, 1999.
Holte et al., "Gesture Recognition using a Range Camera", Technical Report CVMT-07-01 ISSN 1601-3646, Feb. 2007.
Cheng et al., "Articulated Human Body Pose Inference from Voxel Data Using a Kinematically Constrained Gaussian Mixture Model", CVPR EHuM2: 2nd Workshop on Evaluation of Articulated Human Motion and Pose Estimation, 2007.
Microvision Inc., "PicoP® Display Engine—How it Works", 1996-2012.
Primesense Corporation, "PrimeSensor NITE 1.1", USA, year 2010.
Arm Ltd., "AMBA Specification: AHB", Version 2, pp. 35-92, year 1999.
Commission Regulation (EC) No. 1275/2008, Official Journal of the European Union, Dec. 17, 2008.
Primesense, "Natural Interaction", YouTube Presentation, Jun. 9, 2010 http://www.youtube.com/watch?v=TzLKsex43zl~.
Manning et al., "Foundations of Statistical Natural Language Processing", chapters 6,7,9 and 12, MIT Press 1999.
U.S. Appl. No. 12/762,336 Official Action dated May 15, 2012.
Tobii Technology, "The World Leader in Eye Tracking and Gaze Interaction", Mar. 2012.
Noveron, "Madison video eyewear", year 2012.
International Application PCT/IB2012/050577 Search Report dated Aug. 6, 2012.
U.S. Appl. No. 12/683,452 Official Action dated Sep. 7, 2012.
Koutek, M., "Scientific Visualization in Virtual Reality: Interaction Techniques and Application Development", PhD Thesis, Delft University of Technology, 264 pages, Jan. 2003.
Azuma et al., "Recent Advances in Augmented Reality", IEEE Computer Graphics and Applications, vol. 21, issue 6, pp. 34-47, Nov. 2001.
Breen et al., "Interactive Occlusion and Collision of Real and Virtual Objects in Augmented Reality", Technical Report ECRC-95-02, ECRC, Munich, Germany, 22 pages, year 1995.
Burdea et al., "A Distributed Virtual Environment with Dextrous Force Feedback", Proceedings of Interface to Real and Virtual Worlds Conference, pp. 255-265, Mar. 1992.
U.S. Appl. No. 13/541,786 Office Action dated Feb. 13, 2014.

(56) References Cited

OTHER PUBLICATIONS

U.S. Appl. No. 13/423,322 Office Action dated Apr. 7, 2014.
U.S. Appl. No. 13/314,207 Office Action dated Apr. 3, 2014.
U.S. Appl. No. 12/683,452 Office Action dated Jan. 22, 2014.
U.S. Appl. No. 12/314,210 Office Action dated Jan. 10, 2014.
U.S. Appl. No. 13/592,352 Office Action dated Feb. 13, 2014.
Nakamura et al, "Occlusion detectable stereo-occlusion patterns in camera matrix", Proceedings of the 1996 Conference on Computer Vision and Pattern Recognition (CVPR '96), pp. 371-378, Jun. 1996.
U.S. Appl. No. 13/592,352 Office Action dated May 7, 2014.
U.S. Appl. No. 12/721,582 Office Action dated Apr. 17, 2014.
U.S. Appl. No. 14/055,997 Office Action dated May 28, 2014.
Hilliges et al, "Interactions in the air: adding further depth to interactive tabletops", Proceedings of the 22nd annual ACM symposium on User interface software and technology, ACM, pp. 139-148, Oct. 2009.
U.S. Appl. No. 13/423,314 Office Action dated Jul. 31, 2014.
U.S. Appl. No. 12/683,452 Office Action dated Jul. 16, 2014.
U.S. Appl. No. 13/423,314 Advisory Action dated Jun. 26, 2014.
Slinger et al, "Computer—Generated Holography as a Generic Display Technology", IEEE Computer, vol. 28, Issue 8, pp. 46-53, Aug. 2005.
U.S. Appl. No. 12/683,452 Office Action dated Nov. 21, 2014.
U.S. Appl. No. 14/055,997 Office Action dated Nov. 21, 2014.
U.S. Appl. No. 13/592,352 Office Action dated Oct. 2, 2014.
Scharstein, D., "Stereo vision for view synthesis", Proceedings of IEEE Conference on Computer Vision and Pattern Recognition, pp. 852-858, year 1996.
Zhu et al., "Generation and Error Characterization of Pararell-Perspective Stereo Mosaics from Real Video", In-Video Registration, Springer, US, chapter 4,pp. 72-105, year 2003.
Chai et al., "Parallel Projections for Stereo Reconstruction", Proceedings of IEEE Conference on Computer Vision and Pattern Recognition ,vol. 2, pp. 493-500, year 2000.
Evers et al., "Image-based rendering of complex scenes from multi-camera rig", IEEE Proceedings on Vision, Image and Signal Processing, vol. 152, No. 4, pp. 470-480, Aug. 5, 2005.
Evers et al,. "Image-based Interactive rendering with view dependent geometry", Computer Graphics Forum, (Eurographics '03), vol. 22, No. 3, pp. 573-582, year 2003.
Kauff et al., "Depth map creation and image-based rendering for advanced 3DTV Services Providing Interoperability and Scalability", Signal Processing: Image Communication, vol. 22, No. 2, pp. 217-234, year 2007.
U.S. Appl. No. 13/161,508 Office Action dated Dec. 23, 2014.
U.S. Appl. No. 13/592,352 Office Action dated Jan. 29, 2015.

\* cited by examiner

COMBINING EXPLICIT SELECT GESTURES AND TIMECLICK IN A NON-TACTILE THREE DIMENSIONAL USER INTERFACE

CROSS-REFERENCE TO RELATED APPLICATIONS

This application claims the benefit of U.S. Provisional Patent Application 61/523,404 filed on Aug. 15, 2011, and of U.S. Provisional Patent Application 61/526,692 filed on Aug. 24, 2011, which are both incorporated herein by reference.

FIELD OF THE INVENTION

This invention relates generally to user interfaces for computerized systems, and specifically to user interfaces that are based on three-dimensional sensing.

BACKGROUND OF THE INVENTION

Many different types of user interface devices and methods are currently available. Common tactile interface devices include the computer keyboard, mouse and joystick. Touch screens detect the presence and location of a touch by a finger or other object within the display area. Infrared remote controls are widely used, and "wearable" hardware devices have been developed, as well, for purposes of remote control.

Computer interfaces based on three-dimensional (3D) sensing of parts of the user's body have also been proposed. For example, PCT International Publication WO 03/071410, whose disclosure is incorporated herein by reference, describes a gesture recognition system using depth-perceptive sensors. A 3D sensor provides position information, which is used to identify gestures created by a body part of interest. The gestures are recognized based on a shape of a body part and its position and orientation over an interval. The gesture is classified for determining an input into a related electronic device.

As another example, U.S. Pat. No. 7,348,963, whose disclosure is incorporated herein by reference, describes an interactive video display system, in which a display screen displays a visual image, and a camera captures 3D information regarding an object in an interactive area located in front of the display screen. A computer system directs the display screen to change the visual image in response to changes in the object.

Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The description above is presented as a general overview of related art in this field and should not be construed as an admission that any of the information it contains constitutes prior art against the present patent application.

SUMMARY OF THE INVENTION

There is provided, in accordance with an embodiment of the present invention a method including presenting, by a computer, multiple interactive items on a display coupled to the computer, receiving, from a depth sensor, a sequence of three-dimensional (3D) maps containing at least a hand of a user of the computer, detecting, in the maps, an explicit select gesture performed by the user toward one of the interactive items, selecting the one of the interactive items responsively to the explicit select gesture, and actuating, subsequent to selecting the one of the interactive items, a TimeClick functionality for subsequent interactive item selections to be made by the user.

There is also provided, in accordance with an embodiment of the present invention an apparatus including a depth sensor, and a computer executing a non-tactile three dimensional (3D) user interface and configured to present, multiple interactive items on a display coupled to the computer, to receive, from the depth sensor, a sequence of three-dimensional (3D) maps containing at least a hand of a user of the computer, to detect, in the maps, an explicit select gesture performed by the user toward one of the interactive items, to select the one of the interactive items responsively to the explicit select gesture, and to actuate, subsequent to selecting the one of the interactive items, a TimeClick functionality for subsequent interactive item selections to be made by the user There is additionally provided, in accordance with an embodiment of the present invention a computer software product including a non-transitory computer-readable medium, in which program instructions are stored, which instructions, when read by a computer, cause the computer to present multiple interactive items on a display coupled to the computer, to receive, from a depth sensor, a sequence of three-dimensional (3D) maps containing at least a hand of a user of the computer, to detect, in the maps, an explicit select gesture performed by the user toward one of the interactive items, to select the one of the interactive items responsively to the explicit select gesture, and to actuate, subsequent to selecting the one of the interactive items, a TimeClick functionality for subsequent interactive item selections to be made by the user.

BRIEF DESCRIPTION OF THE DRAWINGS

The disclosure is herein described, by way of example only, with reference to the accompanying drawings, wherein.

DETAILED DESCRIPTION OF EMBODIMENTS

When using a tactile input device such as a mouse, the user typically manipulates the physical device in a two-dimensional plane comprising a horizontal X-axis and a vertical Y-axis. However, when interacting with a non-tactile 3D user interface (also referred to herein as a 3D user interface), the user may perform gestures in mid-air, and perform the gestures from different positions within a field of view of a 3D sensor coupled to the interface.

While interacting with a non-tactile 3D user interface, a user can perform a Find gesture in order to highlight (e.g., via a cursor) a given interactive item presented on a display, and then select the highlighted item by performing an explicit select gesture with a part of the user's body such as a hand. Examples of explicit select gestures described hereinbelow include Push, Pull and Grab gestures. In addition to performing the explicit select gestures described herein, the user can select the highlighted interactive item via TimeClick (also referred to herein as a TimeClick gesture). To select a highlighted item via TimeClick, the user keeps his hand relatively steady so that the given interactive item is highlighted for a specific period of time by user 22. The specific period is also referred to herein as the hold-time.

Embodiments of the present invention provide methods and systems for combining explicit select gestures and Time-Click in a non-tactile 3D user interface. In some embodiments, a computer may present multiple interactive items on a display, and upon the user selecting a first interactive item using an explicit select gesture, the computer activates a TimeClick engaged mode, wherein subsequent items can be selected using TimeClick. In an alternative embodiment, the computer may present a TimeClick icon (i.e., a mode key) on the display, and upon the user performing an explicit select gesture to select the TimeClick icon, the 3D user interface activates the TimeClick engaged mode.

System Description

Figure 1:
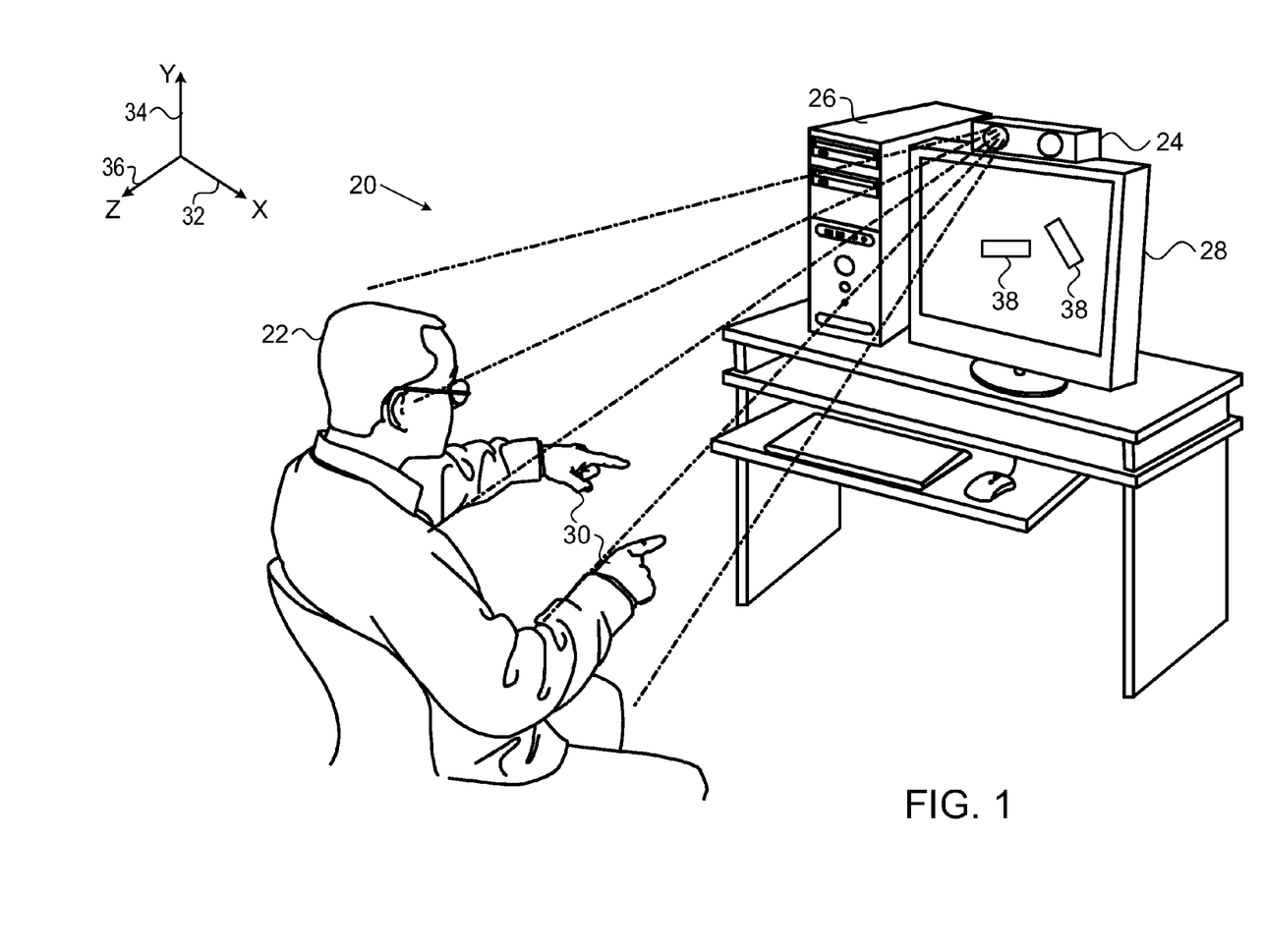
FIG. 1 is a schematic, pictorial illustration of a computer system implementing a non-tactile three dimensional (3D) user interface, in accordance with an embodiment of the present invention.

FIG. 1 is a schematic, pictorial illustration of a non-tactile three dimensional (3D) user interface 20 for operation by a user 22 of a computer 26, in accordance with an embodiment of the present invention. The 3D user interface is based on a 3D sensing device 24 (also referred to herein as a depth sensor) coupled to the computer, which captures 3D scene information of a scene that includes the body (or at least a body part, such as one or more of hands 30) of the user. Device 24 or a separate camera (not shown in the figures) may also capture video images of the scene. The information captured by device 24 is processed by computer 26, which drives a display 28 so as to present and manipulate on-screen interactive items 38. Details of the operation of 3D sensing device 24 are described in U.S. Patent Application 2010/0007717, filed on Mar. 4, 2009, whose disclosure is incorporated herein by reference.

Computer 26, executing 3D user interface 20, processes data generated by device 24 in order to reconstruct a 3D map of user 22. The term "3D map" refers to a set of 3D coordinates measured, by way of example, with reference to a generally horizontal X-axis 32 in space, a generally vertical Y-axis 34 in space and a depth Z-axis 36 in space, based on device 24. The 3D coordinates represent the surface of a given object, in this case the user's body. In one embodiment, device 24 projects a pattern of spots onto the object and captures an image of the projected pattern. Computer 26 then computes the 3D coordinates of points on the surface of the user's body by triangulation, based on transverse shifts of the spots in the pattern. Methods and devices for this sort of triangulation-based 3D mapping using a projected pattern are described, for example, in PCT International Publications WO 2007/043036, WO 2007/105205 and WO 2008/120217, whose disclosures are incorporated herein by reference. Alternatively, interface 20 may use other methods of 3D mapping, using single or multiple cameras or other types of sensors, as are known in the art.

Computer 26 typically comprises a general-purpose computer processor, which is programmed in software to carry out the functions described hereinbelow. The software may be downloaded to the processor in electronic form, over a network, for example, or it may alternatively be provided on non-transitory tangible media, such as optical, magnetic, or electronic memory media. Alternatively or additionally, some or all of the functions of the image processor may be implemented in dedicated hardware, such as a custom or semi-custom integrated circuit or a programmable digital signal processor (DSP). Although computer 26 is shown in FIG. 1, by way of example, as a separate unit from sensing device 24, some or all of the processing functions of the computer may be performed by suitable dedicated circuitry within the housing of the sensing device or otherwise associated with the sensing device.

As another alternative, these processing functions may be carried out by a suitable processor that is integrated with display 28 (in a television set, for example) or with any other suitable sort of computerized device, such as a game console or media player. The sensing functions of device 24 may likewise be integrated into the computer or other computerized apparatus that is to be controlled by the sensor output.

Actuating Timeclick Functionality

Figure 2:
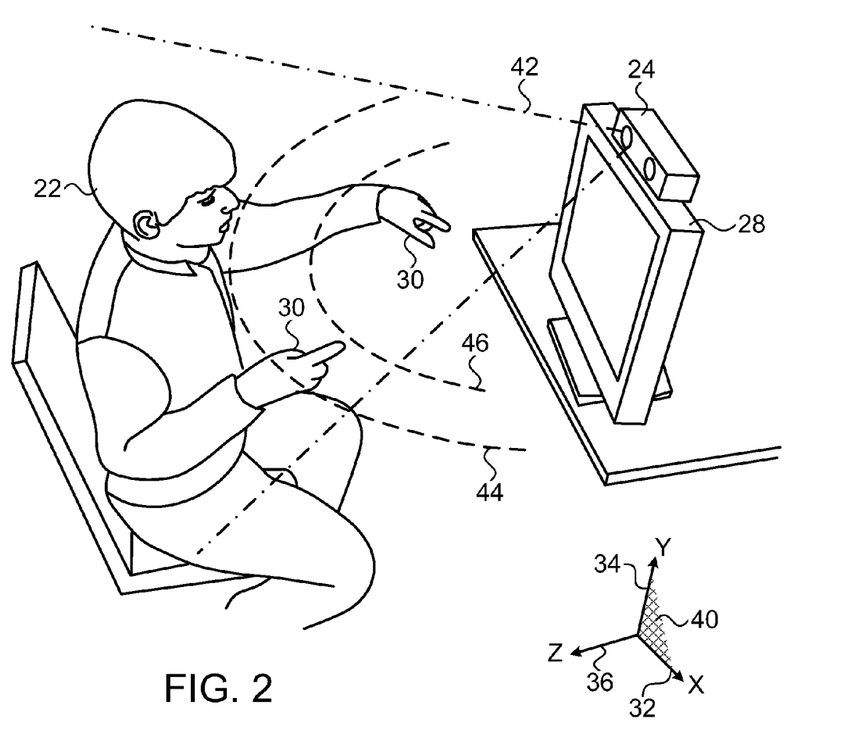
FIG. 2 is a schematic, pictorial illustration showing visualization and interaction regions associated with the non-tactile 3D user interface, in accordance with an embodiment of the present invention.

FIG. 2 is a schematic, pictorial illustration showing how user 22 may interact with visualization and interaction regions associated with 3D user interface 20, in accordance with an embodiment of the present invention. For the purpose of this illustration, an X-Y plane 40 is taken to be parallel to the plane of display screen 28, with distance (depth) perpendicular to this plane corresponding to the Z-axis, and the origin located at device 24. Computer 26 creates a depth map of objects within a field of view 42 of device 24, including the parts of the user's body that are in the field of view.

The operation of 3D user interface 20 is based on an artificial division of the space within field of view 42 into a number of regions:

A visualization surface 44 defines the outer limit of a visualization region. Objects beyond this limit (such as the user's head in FIG. 2) are ignored by user interface 20. When a body part of the user is located within the visualization surface, the user interface detects it and provides visual feedback to the user regarding the location of that body part, typically in the form of an image or icon on display screen 28. In FIG. 2, both of the user's hands are in the visualization region.

An interaction surface 46, which is typically located within the visualization region, defines the outer limit of the interaction region. When a part of the user's body crosses the interaction surface, computer 26 can responsively execute control instructions, as would occur, for instance, if the user made physical contact with an actual touch screen. In this case, however, no physical contact is required to trigger the action. In the example shown in FIG. 2, the user's left hand has crossed the interaction surface and may thus interact with application objects.

The interaction and visualization surfaces may have any suitable shapes. In some embodiments, the inventors have found spherical surfaces to be convenient, as shown in FIG. 2. In alternative embodiments, one or both of the surfaces may be planar.

Various methods may be used to determine when a body part has crossed interaction surface 46 and where it is located. For simple tasks, static analysis of the 3D locations of points in the depth map of the body part may be sufficient. Alternatively, dynamic, velocity-based detection may provide more timely, reliable results, including prediction of and adaptation to user gestures as they occur. Thus, when a part of the user's body moves toward the interaction surface for a sufficiently long time, it is assumed to be located within the interaction region and may, in turn, result in objects being moved, resized or rotated, or otherwise controlled depending on the motion of the body part.

In operation, upon computer 26 detecting a given hand 30 between visualization surface 44 and display 28, the computer may responsively highlight a given interactive item 38 in response to the given hand's location. In instances where user 22 positions both hands 30 between visualization surface 44 and display 28, computer 26 may select the hand that is closer to the display as the given hand.

Figure 4:
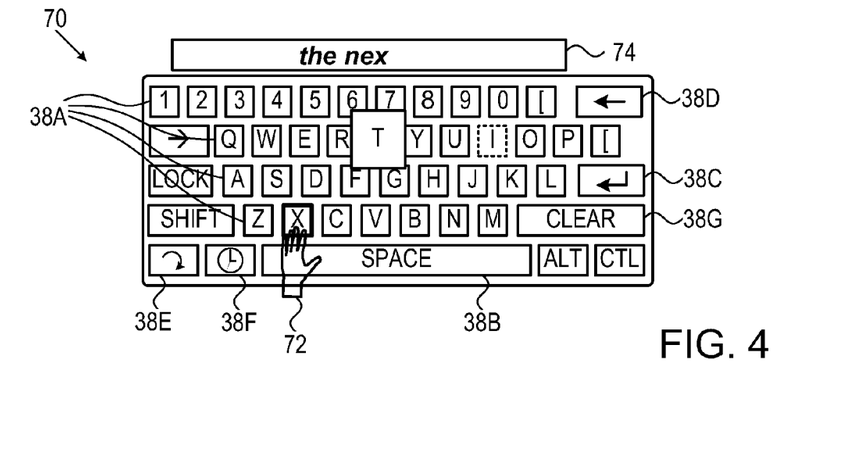
FIG. 4 is a schematic pictorial illustration of an on-screen keyboard for use with the non-tactile 3D user interface, in accordance with an embodiment of the present invention.

If user 22 wants to highlight a different interactive item 38, the user can perform a Find gesture, by moving hand 30 along X-Y plane 40. In some embodiments, computer 26 may highlight a given interactive item 38 by presenting a visual effect. For example, computer 26 can highlight the given interactive item by increasing the brightness of the given interactive item on display 28 or changing the color of the given interactive item. In alternative embodiments (as shown in FIG. 4 hereinbelow), computer 26 may highlight a given interactive item by presenting a cursor in proximity to the given interactive item. The Find gesture is described in U.S. patent application Ser. No. 13/314,207, filed on Dec. 8, 2011, whose disclosure is incorporated herein by reference.

Figure 3:
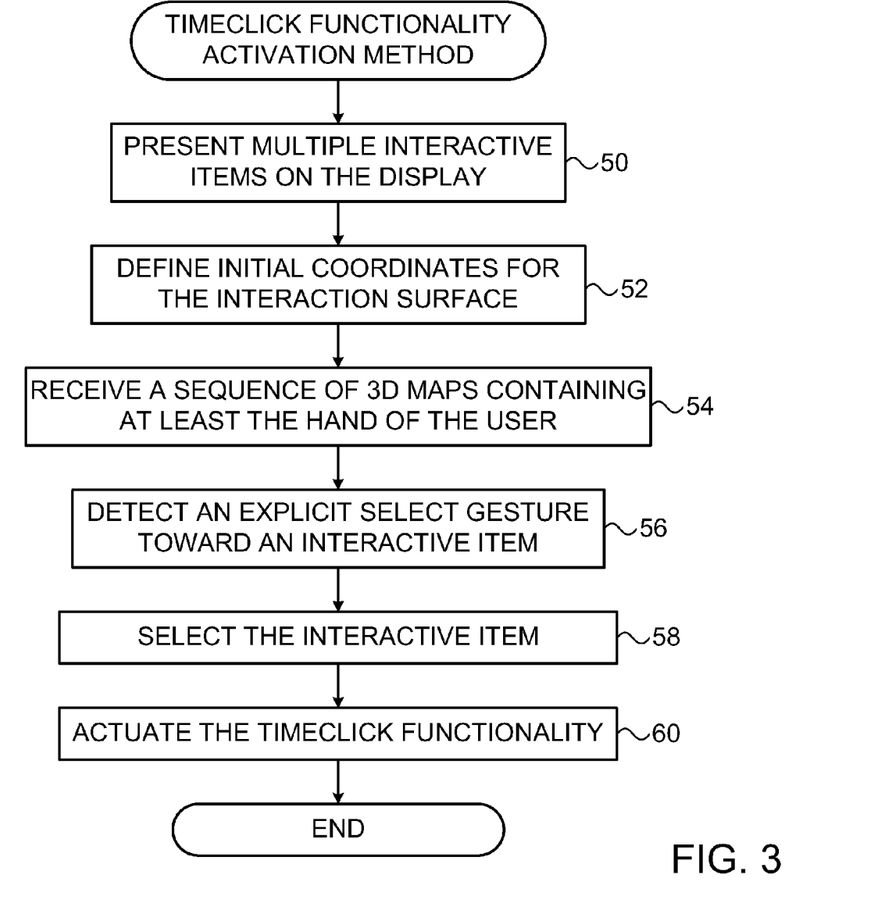
FIG. 3 is a flow diagram that schematically illustrates a method of activating TimeClick functionality, in accordance with an embodiment of the present invention.

FIG. 3 is a flow diagram that schematically illustrates a method of activating TimeClick functionality (also referred to herein as a TimeClick engaged mode), in accordance with an embodiment of the present invention. In an initial step 50, computer 26 presents multiple interactive items 38 on display 28, and in a definition step 52, the computer defines initial coordinates in space in proximity to the user for interaction surface 46.

In a receive step 54, computer 26 receives, from sensing device 24, a sequence of 3D maps containing at least hand 30, which is positioned within field of view 42. In a detect step 56, computer 26 detects, in the received 3D maps, an explicit select gesture directed toward a given interactive item 38, and in a select step 58, the computer selects the given interactive item responsively to the explicit select gesture. In the disclosure and in the claims, an explicit select gesture is assumed to comprise a movement or series of movements of a body part (typically hand 30) which computer 26 has been programmed to recognize as causing an interaction with the computer.

Examples of explicit select gestures that can be used to select the highlighted interactive item include, but are not limited to Grab, Pull and Push gestures. The Grab, Pull and Push gestures are described in U.S. patent application Ser. No. 13/423,314, filed on Mar. 19, 2012, whose disclosure is incorporated herein by reference. While the explicit select gestures described herein comprise the Grab, Pull and Push gestures, other explicit select gestures performed by hand 30 (or any other body part of user 22), corresponding to the definition hereinabove, are considered to be within the spirit and scope of the present invention.

To select the highlighted interactive item using a Pull gesture, hand 30 is initially positioned between interaction surface 46 and display 28. To perform the Pull gesture, user 22 moves hand 30 away from display, and computer 26 selects the highlighted interactive item upon hand 30 crossing the interactive surface. To perform a Grab gesture user 22 closes at least some fingers of hand 30 (i.e., "grabbing" the item). In some embodiments user 22 can combine a Grab gesture with a Pull gesture (i.e., the user first performs a Grab gesture and then performs a Pull gesture while some fingers of the hand remain closed).

To select the highlighted interactive item using a Push gesture, hand 30 is initially positioned between visualization surface 44 and interaction surface 46. To perform the Push gesture, user 22 moves hand 30 toward display 28, and computer selects the highlighted interactive item upon hand 30 crossing the interactive surface.

Returning to the flow diagram, in a TimeClick step 60, computer 26 switches to a TimeClick engaged mode that actuates TimeClick functionality for subsequent selection of interactive items 38 to be made by the user, and the method ends. Upon entering the TimeClick engaged mode, user 22 can select subsequent interactive items 38 via either an explicit select gesture or TimeClick.

To select a subsequent interactive item using a TimeClick gesture, computer 26 receives a subsequent sequence of 3D maps containing at least hand 30, and detects, in the subsequent sequence of 3D maps, a TimeClick gesture directed at the subsequent interactive item. As explained supra, the TimeClick gesture comprises user 22 keeping hand 30 relatively steady for a specific period of time while computer 26 is highlighting the subsequent interactive item. The specific period of time is also referred to herein as a hold-time or a hold-time parameter.

In some embodiments (i.e., while the TimeClick functionality is actuated), computer 26 can adjust the hold-time parameter in response to a distance between user 22 and sensing device 24. For example, as user 22 moves farther away from 3D sensing device 24, computer 26 can increase the hold-time, since the quality of data collected by the 3D sensing device typically deteriorates as the distance increases between the user and the 3D sensing device.

In some embodiments, selecting a given interactive item 38 comprises executing a software application associated with the given interactive item. In further embodiments the given interactive item is associated with a media item (e.g., a music track or a movie), and selecting a given interactive item 38 comprises playing a media file associated with the given interactive item. In alternative embodiments, computer 26 may present a virtual input device on display 28, and user can interact with the virtual input device using the embodiments described herein. Examples of virtual input devices include but are not limited to on-screen keyboards, keypads and game controls.

FIG. 4 is a schematic pictorial illustration of an on-screen keyboard 70, in accordance with an embodiment of the present invention. In the description of FIG. 4 herein, some of interactive items 38 may be differentiated by appending a letter to the identifying numeral, so that keyboard 70 comprises interactive items 38A-38G.

In the configuration shown in FIG. 4, keyboard 70 comprises alphanumeric keys 38A, a spacebar 38B, an Enter key 38C (also known as a Return key), and a Backspace key 38D. In some embodiments, while interacting with 3D user interface 20, computer 26 positions a hand-shaped cursor 72 on display 28 responsively to user 22 performing a Find gesture. In alternative embodiments (as described supra), computer 26 can highlight a given alphanumeric key 38 in response to the Find gesture. Upon the user selecting one of the alphanumeric keys (i.e., via an explicit select gesture or via TimeClick), computer 26 can present a corresponding alphanumeric character in a text box 74.

For example, to type the word "THE" (as shown in text box 74), user 22 first performs a Find gesture to position cursor 72 over the alphanumeric key "T", and then performs a Push gesture. Upon presenting "T" in text box 72, computer 26 transitions to the TimeClick engaged mode. To complete typing "THE", user 22 performs a Find gesture to position cursor 80 over the alphanumeric key "H", and keeps hand 30 steady until computer 26 accepts the alphanumeric key "H" as input. Finally, user 22 performs a Find gesture to position cursor 80 over the alphanumeric key "E", and keeps hand 30 steady until computer 26 accepts the alphanumeric key "E" as input. While in TimeClick mode, user 22 may also select alphanumeric keys "H" and "E" using an explicit select gesture such as the Push, the Pull and the Grab gestures described supra.

In some embodiments, while in the TimeClick engaged mode, computer 26 may be configured to alter explicit select gesture parameters. For example, if user 22 can perform a Push gesture to select a highlighted interactive item 38 (e.g., one of the alphanumeric keys) by moving hand 30 forward along Z-axis 36 until the hand crosses interaction surface 46. To enable user to more easily select a highlighted item (e.g., one of alphanumeric keys 38) while in the TimeClick engaged mode, computer 26 may redefine the coordinates of the interaction surface, so that the interaction surface is positioned closer to the user (e.g., so that a closest distance of the interactive surface to a pre-selected portion of user 22 moves from eight inches to four inches.). Likewise, if user 22 is performing a Pull gesture to select the highlighted interactive item while in TimeClick engaged mode, computer 26 may redefine the coordinates of the interaction surface so that the interaction surface is positioned further from the user.

In some embodiments, computer 26 can convey visual feedback to user 22 while the user is selecting a given alphanumeric key using TimeClick. As the example in FIG. 4 shows, in response to user 22 performing a Find gesture, computer 26 positions cursor 72 over the alphanumeric key "X". As the user keeps hand 30 steady and thereby maintaining the cursor over the alphanumeric key "X" (i.e., before the amount of time specified by the hold-time parameter), the computer can increase shading in the alphanumeric key, or fill a border surrounding the alphanumeric key, or break a border (as shown in the Figure for letters "X" and "I"). Another example of visual feedback, using the letter "T", is described below.

In some embodiments, while in the TimeClick engaged mode, computer 26 can be configured to adjust the hold-time parameter in response to a proficiency of user 22 as follows:
  If computer 26 detects that user 22 selected a specified number of alphanumeric keys 38 without selecting backspace key 38D (i.e., without any errors), the computer can shorten the hold-time parameter.
  If computer 26 detects that the user spends less time performing Find gestures while selecting alphanumeric keys 38, the computer can shorten the hold-time parameter. For example, while interacting with on-screen keyboard 70, if the user is spending 50% of the time performing Find gestures and 50% of the time holding the cursor steady to select a given alphanumeric key via TimeClick, the 3D user interface can shorten the hold-time parameter to make text entry less cumbersome (e.g., an optimal breakdown of the time to select a given alphanumeric key 38 may be 90% for the Find gesture and 10% for TimeClick).

On-screen keyboard 70 may also include a TimeClick timer icon 38F that user 22 can select in order to change the hold-time parameter. For example, a novice user can set the hold-time parameter to a longer time period such as three seconds, while a more experienced user can set the hold-time parameter to a shorter time period such as one second. In operation, computer 26 can adjust the hold-time parameter upon detecting, in a subsequent sequence of 3D maps (i.e., subsequent to the 3D maps received in step 54 hereinabove) a subsequent select gesture (i.e., either an explicit select gesture or a TimeClick gesture) performed by the user toward the timer icon 38F.

In addition to the TimeClick mode, computer 26 may include one or more additional Select modes that enable user 22 to select a given alphanumeric key 38 using explicit select gestures. In some configurations, computer 26 may include separate Select modes for each of the explicit select gestures recognized by the computer.

In the configuration shown in FIG. 4, computer 26 presents a mode icon 38E that enables user 22 to toggle between the TimeClick mode and a given Select mode. In operation, computer 26 can actuate the TimeClick functionality upon detecting an explicit select gesture (e.g., a Pull, Push or Grab gesture) in the sequence of 3D maps received in step 54. While 3D user interface 20 is in the TimeClick mode, computer 26 can convey visual feedback such as illuminating mode icon 38E in a different color, or have the mode key blink on and off.

In some embodiments, computer 26 can implement a predictive text algorithm (also known as a language model) to aid user 22 in entering text via on-screen keyboard 70. The predictive text algorithm can implement techniques known in the art that predict the next alphanumeric key 38 to be selected by user 22 based on previously selected keys. For example, if user 22 has already selected the alphanumeric keys "N", "E" and "X", the predictive text algorithm may identify "T" as the next alphanumeric key to be selected.

Examples for integrating the predictive text algorithm for use with virtual keyboard 70 include:
  Increasing the active area for a given alphanumeric key 38 of a character identified by the predictive text algorithm. Using the example described supra, FIG. 4 shows the alphanumeric key "T" larger than the other alphanumeric keys. Increasing the active area can ease alphanumeric key selection in both the select mode and the TimeClick mode.
  Adjusting the position of interaction surface 46 for one or more characters identified (e.g., the letter "T" in the example described supra) by the predictive text algorithm. For example, if user 22 is performing a Push gesture, computer 26 can reposition interaction surface 46 closer to the user for the alphanumeric key "T". Likewise, if user 22 is performing a Pull gesture, computer 26 can reposition interaction surface 46 closer to display 28 for the alphanumeric key "T". Moving the interaction surface for specific alphanumeric keys 38 corresponding to characters identified by the predictive text algorithm can help the user enter text faster via the on-screen keyboard.
  Shortening the hold-time parameter for the alphanumeric keys corresponding to characters identified by the predictive text algorithm. In the example described supra, if the regular hold-time parameter is one second, the hold-time parameter for the alphanumeric key "T" can be shortened to 0.5 seconds, thereby enabling a proficient user to rapidly select the alphanumeric key "T".

While interacting with traditional user interfaces such as keyboards, maintaining pressure on a particular alphanumeric key typically results in the particular key being repeated (e.g., pressing the "C" key results in "CCCCCCCC . . . " being presented on the display). Due to the nature of interacting with the 3D user interface, user 22 may keep hand 30 steady after selecting one of alphanumeric keys 38. To reduce input errors, embodiments of the present invention may limit the repeating described supra to a subset of the alphanumeric keys, such as spacebar 38B, Backspace key 38D and arrow keys (not shown). Additionally or alternatively, keyboard 70 may comprise a clear key 38G, and computer 26 can be configured to clear any text in text box 74 when the clear key is selected.

Figure 5:
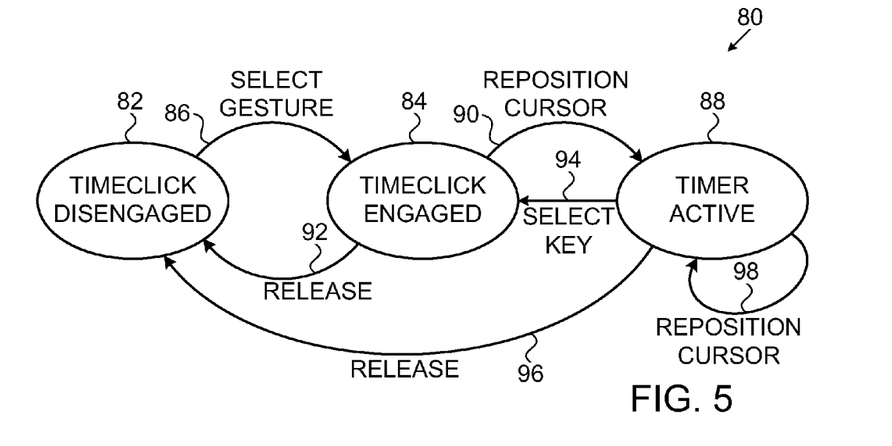
FIG. 5 is a state diagram that schematically illustrates states and transitions of the computer executing the non-tactile 3D user interface, in accordance with an embodiment of the present invention.

FIG. 5 is a state diagram 80 that schematically illustrates the states and the transitions of computer 26 executing 3D user interface 20, in accordance with an embodiment of the present invention. Prior to user 22 selecting any interactive items 38 on display 28 using an explicit select gesture, computer 26 is in a TimeClick disengaged state 82. Upon user 22 performing an explicit select gesture in order to select given interactive item 38, computer 26 transitions to a TimeClick engaged state 84 via a touch transition 86.

While in state 84, user 22 can select interactive items 38 via TimeClick or via an explicit select gesture (i.e., using parameters for both the TimeClick and the select modes described supra). If, while in state 84, computer 26 repositions cursor 72 (or highlights a different interactive item 38) in response to a Find gesture performed by user 22, then the computer transitions to a timer active state 88 via a reposition cursor transition 90.

Alternatively, while in state 84, if computer 26 detects that user 22 has moved hand 30 to either a specific region within field of view 42 or outside field of view 42 (i.e., the computer cannot detect the hand), then the computer transitions back to state 82 via a release transition 92. For example, computer 26 can transition from the TimeClick engaged state to the TimeClick disengaged state via the release transition upon repositioning cursor 72 outside on-screen keyboard 70 in response to a Find gesture performed by the user.

Upon transitioning to timer active state 88, computer 26 may start a timer (typically a software module executing on the computer) upon presenting cursor 72 on a given interactive item (or highlighting the given interactive item) in response to a Find gesture performed by user 22. The timer keeps incrementing as long as computer 26 presents cursor 72 on the given interactive item (i.e., since user 22 is keeping hand 30 relatively steady). Computer 26 can select the given alphanumeric key upon the timer incrementing to a preset hold-time period (e.g., three seconds).

Alternatively, while in timer active state 88, computer 26 can select a given interactive item 38 in response to detecting user 22 performing an explicit select gesture while the computer presents cursor 72 on the given interactive item (or highlights the given interactive item if the cursor is not presented). As discussed supra, while in TimeClick mode (i.e., states 84 and 88), computer 26 may reposition reference interaction surface 46, thereby reducing the distance that user 22 needs to move hand 30 (and reducing or eliminating the wait time associated with TimeClick) in order to select the given interactive item via an explicit select gesture.

Upon selecting a given interactive item 38, computer 26 transitions back to state 84 via a select item transition 94. Alternatively, if computer 26 detects that user 22 has moved hand 30 to either a specific region within field of view 42 (e.g., so that the computer presents cursor 72 outside on-screen keyboard 70) or outside field of view 42 (i.e., the computer cannot detect the hand), then the computer transitions back to state 82 via a release transition 96. Further alternatively, upon computer 26 positioning cursor 72 on a different interactive item 38 (or highlighting a different interactive item 38) in response to user 22 performing a Find gesture, then computer 26 transitions to state 88 (i.e., from state 88) via a reposition cursor transition 98, and thereby restarts the timer.

Flashlight Cursor

Figure 6A:
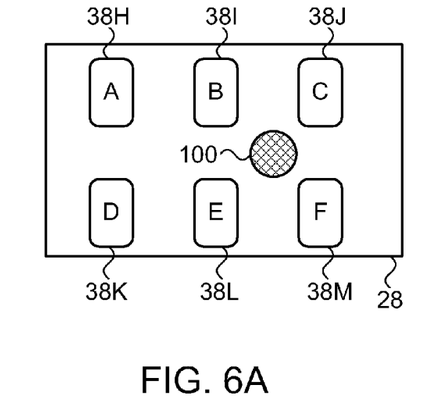
FIGS. 6A and 6B are schematic pictorial illustrations of the computer presenting a flashlight cursor, in accordance with an embodiment of the present invention.
Figure 6B:
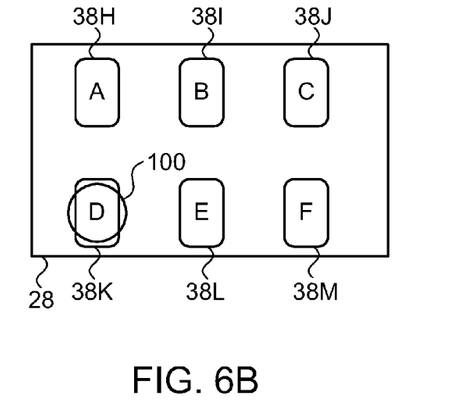

FIGS. 6A and 6B are schematic pictorial illustrations of computer 26 presenting a flashlight cursor 100, in accordance with an embodiment of the present invention. In the description of FIGS. 6A and 6B herein, some of interactive items 38 may be differentiated by appending a letter to the identifying numeral, so that the interactive items presented on display 28 in FIG. 6A and 6B comprise interactive items 38H-38M.

The inventors selected a flashlight metaphor for cursor 100 since positioning the flashlight cursor is similar to aiming a flashlight. Typically, when an individual wants to illuminate a given physical region (e.g., an area on a wall) with a flashlight, the individual first turns on the flashlight, repositions the flashlight so that the given region is illuminated, and then holds the flashlight steady in order to keep the given region illuminated.

In embodiments of the present invention, user 22 can select a given interactive item 38 in a similar manner, by first pointing hand 30 toward display 28 in order to activate flashlight cursor 100, and then moving the hand in a transverse motion (i.e., along X-Y plane 40) in order to reposition the flashlight cursor over a given interactive item 38.

In the configuration shown in FIG. 6A, computer 26 presents items 38H-38M on display 28. In operation, if computer 26 detects user 22 pointing hand 30 toward display 28, the computer determines the position (location and orientation) of the hand, and responsively presents flashlight cursor 100 at a corresponding location on display 28. In the example shown in FIG. 6A, computer 26 initially presents flashlight cursor 100 as a small shaded circle. Upon detecting, in the maps, user 22 moving hand 30 along X-Y plane 40, computer 26 repositions cursor 100 accordingly.

After positioning cursor 110 over a given interactive item 38, computer 26 can select the given interactive item upon detecting user 22 performing a TimeClick gesture while the flashlight cursor is positioned over the given interactive item. To select a given interactive item 38 using TimeClick, user 22 keeps hand 30 relatively still for a specific period of time (i.e., the hold-time described supra) while computer 26 positions cursor 110 over the given interactive item.

FIG. 6B is a schematic pictorial illustrations of user 22 selecting item 68 using TimeClick, in accordance with an embodiment of the present invention. In the example shown in FIG. 6B, as computer 26 presents flashlight cursor over interactive item 38K for the hold-time, the computer can gradually remove the shading from cursor 100 (i.e., terminating the animation effect), thereby bringing the interactive item 38K into focus.

While repositioning cursor 100, computer 26 can animate cursor 100 with a visual effect such as changing the color and/or shading presented within the cursor. Upon detecting, in the maps, user performing a TimeClick gesture, computer 26 can gradually change the appearance of cursor 100 by decreasing the visual effect during the hold-time period. In other words, computer 26 can select interactive item 38K as the interactive item "comes into focus" behind flashlight cursor 100.

Figure 7:
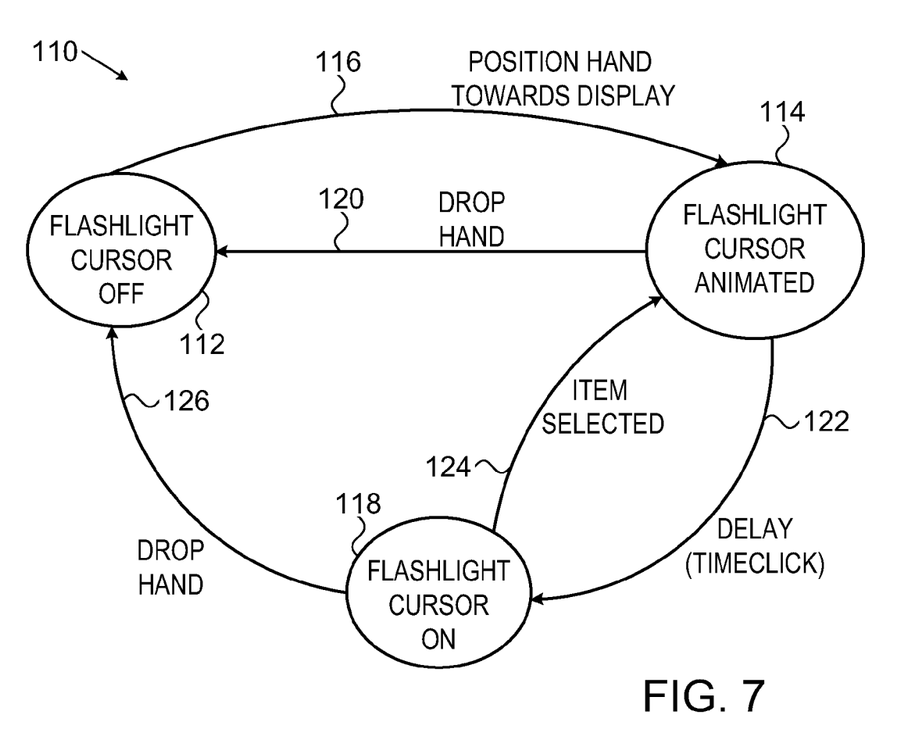
FIG. 7 is a state diagram that schematically illustrates states and transitions of the computer implementing the flashlight cursor, in accordance with an embodiment of the present invention.

FIG. 7 is a state diagram 110 that schematically illustrates the states and the transitions of computer 26 implementing flashlight cursor 100, in accordance with an embodiment of the present invention. Prior to user 22 performing a pointing gesture toward display 28, computer 26 is in a flashlight cursor off state 112.

Upon detecting, in the sequence of 3D maps, user 22 pointing hand 30 toward display 28, computer 26 transitions to flashlight cursor animated state 114 via a transition 116. While in state 114, computer 26 has not yet selected any of the interactive items presented on display 28, and the computer can present flashlight cursor 100 with a visual effect (e.g., animation), as shown in FIG. 6A. For example (i.e., while in state 114), computer 26 may detect, in the 3D maps, a transverse motion of hand 30 (i.e., along X-Y plane 40), and reposition flashlight cursor 100 on display 28 in response to the transverse motion.

While in state 114, if computer 26 detects (e.g., in the maps) that user 22 stops moving hand 30 for the hold-time, the computer can illuminate (i.e., "turns on") flashlight cursor 100 upon transitioning to a flashlight cursor on state 118 via a transition 122. Upon transitioning to state 118 via transition 122, computer 26 can select a given interactive item 38 positioned "behind" the flashlight cursor. In the example shown in FIG. 6B, computer 26 selects interactive item 38K in response to detecting, in the maps, user 22 pointing hand 30 toward interactive item 38K and subsequently keeping hand 30 steady for the hold-time period. However, if computer 26 detects, user 22 no longer pointing hand 30 toward display 28 (e.g., by dropping the hand) while the computer is in state 114, then the computer transitions back to state 112 via a transition 120.

Returning to state 118, if computer 26 selects a given interactive item 38, and detects, user 22 still pointing hand 30 toward display 28, then the computer transitions back to state 114 via a transition 124. Alternatively (i.e., while in state 118), if computer 26 detects, user 22 ending the pointing gesture, then the computer transitions back to state 112 via a transition 126.

It will be appreciated that the embodiments described above are cited by way of example, and that the present invention is not limited to what has been particularly shown and described hereinabove. Rather, the scope of the present invention includes both combinations and subcombinations of the various features, including the transformations and the manipulations, described hereinabove, as well as variations and modifications thereof which would occur to persons skilled in the art upon reading the foregoing description and which are not disclosed in the prior art.

We claim:

1. A method, comprising:
  presenting, by a computer, multiple interactive items on a display coupled to the computer;
  receiving, from a depth sensor, a sequence of three-dimensional (3D) maps containing at least a hand of a user of the computer at a variable distance from the depth sensor;
  detecting, in the maps, an explicit select gesture performed by the user toward one of the interactive items;
  selecting the one of the interactive items responsively to the explicit select gesture;
  actuating, subsequent to selecting the one of the interactive items, a TimeClick functionality for subsequent interactive item selections to be made by the user; and
  detecting, after actuating the TimeClick functionality, a TimeClick gesture directed at one of the subsequent interactive items, wherein the TimeClick gesture comprises the user keeping the hand relatively steady for a specific period of time, and wherein the specific time period is adjusted in response to the distance between the user and the depth sensor.

2. The method according to claim 1, and comprising presenting a cursor on the display, the cursor having a visual effect, and decreasing the visual effect upon detecting the user keeping the hand relatively steady for the specific period of time.

3. The method according to claim 1, and comprising adjusting the specific time period in response to a proficiency of the user.

4. The method according to claim 1, wherein the multiple interactive items comprise alphanumeric keys for an on-screen keyboard presented on the display, and comprising adjusting the specific time period in response to a predictive text algorithm.

5. The method according to claim 1, wherein one of the multiple interactive items comprises a TimeClick timer icon, and comprising adjusting the specific time period upon detecting, in the subsequent sequence of 3D maps a subsequent select gesture performed by the user toward the TimeClick timer icon.

6. The method according to claim 5, wherein the subsequent select gesture is selected from a list comprising the explicit select gesture and the TimeClick gesture.

7. The method according to claim 1, wherein one of the multiple interactive icons comprises a mode icon, and comprising actuating the TimeClick functionality upon detecting, in the sequence of 3D maps, the explicit select gesture toward the mode icon.

8. The method according to claim 1, wherein the explicit select gesture is selected from a list comprising a Push gesture, a Pull gesture, and a Grab gesture.

9. The method according to claim 1, and comprising prior to detecting the select gesture, defining coordinates for an interactive surface positioned in space in proximity to the user, and wherein completing the explicit select gesture comprises the hand crossing the interactive surface.

10. The method according to claim 9, wherein actuating the TimeClick functionality comprises redefining the coordinates of the interactive surface.

11. An apparatus, comprising:
  a depth sensor; and
  a computer executing a non-tactile three dimensional (3D) user interface and configured to present, multiple interactive items on a display coupled to the computer, to receive, from the depth sensor, a sequence of three-dimensional (3D) maps containing at least a hand of a user of the computer at a variable distance from the depth sensor, to detect, in the maps, an explicit select gesture performed by the user toward one of the interactive items, to select the one of the interactive items responsively to the explicit select gesture, and to actuate, subsequent to selecting the one of the interactive items, a TimeClick functionality for subsequent interactive item selections to be made by the user,
  wherein the computer is configured to detect, after actuating the TimeClick functionality, a TimeClick gesture directed at one of the subsequent interactive items, wherein the TimeClick gesture comprises the user keeping the hand relatively steady for a specific period of time, and wherein the specific time period is adjusted in response to the distance between the user and the depth sensor.

12. The apparatus according to claim 11, wherein the computer is configured to present a cursor on the display, the cursor having a visual effect, and to decrease the visual effect upon detecting the user keeping the hand relatively steady for the specific period of time.

13. The apparatus according to claim 11, wherein the computer is configured to adjust the specific time period in response to a proficiency of the user.

14. The apparatus according to claim 11, wherein the multiple interactive items comprise alphanumeric keys for an on-screen keyboard presented on the display, and wherein the computer is configured to adjust the specific time period in response to a language model.

15. The apparatus according to claim 11, wherein one of the multiple interactive items comprises a TimeClick timer icon, and wherein the computer is configured to adjust the specific time period upon detecting, in the subsequent sequence of 3D maps a subsequent select gesture performed by the user toward the TimeClick timer icon.

16. The apparatus according to claim 15, wherein the computer is configured to select the subsequent select gesture from a list comprising the explicit select gesture and the TimeClick gesture.

17. The apparatus according to claim 11, wherein one of the multiple interactive icons comprises a mode icon, and wherein the computer is configured to actuate the TimeClick functionality upon detecting, in the sequence of 3D maps, the explicit select gesture toward the mode icon.

18. The apparatus according to claim 11, wherein the computer is configured to select the explicit select gesture from a list comprising a Push gesture, a Pull gesture, and a Grab gesture.

19. The apparatus according to claim 11, wherein the computer is configured to the define, prior to detecting the select gesture, coordinates for an interactive surface positioned in space in proximity to the user, and wherein completing the explicit select gesture comprises the hand crossing the interactive surface.

20. The apparatus according to claim 19, wherein the computer is configured to actuate the TimeClick functionality by redefining the coordinates of the interactive surface.

21. A computer software product comprising a non-transitory computer-readable medium, in which program instructions are stored, which instructions, when read by a computer executing a non-tactile user interface, cause the computer to present multiple interactive items on a display coupled to the computer, to receive, from a depth sensor, a sequence of three-dimensional (3D) maps containing at least a hand of a user of the computer at a variable distance from the depth sensor, to detect, in the maps, an explicit select gesture performed by the user toward one of the interactive items, to select the one of the interactive items responsively to the explicit select gesture, and to actuate, subsequent to selecting the one of the interactive items, a TimeClick functionality for subsequent interactive item selections to be made by the user,
   wherein the computer is configured to detect, after actuating the TimeClick functionality, a TimeClick gesture directed at one of the subsequent interactive items, wherein the TimeClick gesture comprises the user keeping the hand relatively steady for a specific period of time, and wherein the specific time period is adjusted in response to the distance between the user and the depth sensor.

\* \* \* \* \*